(12) United States Patent
Al Dahlan et al.

(10) Patent No.: US 9,334,721 B2
(45) Date of Patent: May 10, 2016

(54) METHOD OF USING A NON-ACIDIC STIMULATION FLUID IN HIGH TEMPERATURE SANDSTONE FORMATIONS

(71) Applicant: Saudi Arabian Oil Company, Dhahran (SA)

(72) Inventors: Mohammed Nasser Al Dahlan, Al Khouber (SA); Khalid Abdullah Al Dossary, Dammam (SA); Abdullah Mohammed Al Harith, Althoqbah (SA)

(73) Assignee: Saudi Arabian Oil Company, Dhahran (SA)

(*) Notice: Subject to any disclaimer, the term of this patent is extended or adjusted under 35 U.S.C. 154(b) by 440 days.

(21) Appl. No.: 13/724,153

(22) Filed: Dec. 21, 2012

(65) Prior Publication Data

US 2013/0161012 A1  Jun. 27, 2013

Related U.S. Application Data

(60) Provisional application No. 61/579,914, filed on Dec. 23, 2011.

(51) Int. Cl.
*E21B 43/28* (2006.01)
*C09K 8/72* (2006.01)
*C09K 8/84* (2006.01)

(52) U.S. Cl.
CPC . *E21B 43/28* (2013.01); *C09K 8/72* (2013.01); *C09K 8/845* (2013.01)

(58) Field of Classification Search
CPC ...................................................... E21B 43/28
USPC ....................................................... 166/370
See application file for complete search history.

(56) References Cited

U.S. PATENT DOCUMENTS

| | | | |
|---|---|---|---|
| 1,990,969 A | 3/1933 | Wilson | |
| 2,094,479 A | 9/1937 | Vandergrift | |
| 2,466,674 A | 4/1949 | Mullady | |
| 2,699,213 A * | 1/1955 | Cardwell et al. | 166/281 |
| 2,885,004 A | 5/1959 | Perry | |
| 3,025,911 A | 3/1962 | Bergman | |
| 3,483,923 A | 12/1969 | Darley | |
| 3,543,856 A | 12/1970 | Knox et al. | |
| 3,568,772 A | 3/1971 | Gogarty et al. | |
| 3,707,192 A | 12/1972 | Goins, Jr. et al. | |
| 3,719,228 A | 3/1973 | Carcia | |
| 3,760,881 A | 9/1973 | Kiel | |
| 3,828,854 A | 8/1974 | Templeton et al. | |
| 4,056,146 A | 11/1977 | Hall | |
| 4,085,799 A | 4/1978 | Bousaid et al. | |
| 4,136,739 A | 1/1979 | Salathiel et al. | |
| 4,158,042 A | 6/1979 | Deutschman | |
| 4,284,140 A * | 8/1981 | Sydansk et al. | 166/291 |
| 4,291,765 A | 9/1981 | Gilchrist et al. | |
| 4,414,118 A | 11/1983 | Murphey | |
| 4,518,040 A | 5/1985 | Middleton | |
| 4,703,803 A | 11/1987 | Blumer | |
| 5,082,058 A | 1/1992 | Blumer | |
| 5,152,906 A | 10/1992 | Aften et al. | |
| 5,375,660 A | 12/1994 | Wehunt | |
| 5,411,094 A | 5/1995 | Northrop | |
| 7,066,260 B2 | 6/2006 | Sullivan et al. | |
| 7,153,434 B1 | 12/2006 | Dennis | |
| 7,328,746 B2 | 2/2008 | Al-Taq et al. | |
| 7,540,328 B2 | 6/2009 | Brown et al. | |
| 7,779,915 B2 | 8/2010 | Hutchins et al. | |
| 8,096,361 B2 | 1/2012 | Willberg | |
| 2005/0000694 A1 | 1/2005 | Dalrymple et al. | |
| 2008/0289828 A1 * | 11/2008 | Hutchins et al. | 166/308.3 |
| 2011/0030958 A1 | 2/2011 | Fedorov et al. | |
| 2011/0220360 A1 * | 9/2011 | Lindvig et al. | 166/305.1 |

FOREIGN PATENT DOCUMENTS

EP    0654582    5/1995

OTHER PUBLICATIONS

PCT International Search Report, Mar. 11, 2013.

* cited by examiner

*Primary Examiner* — Catherine Loikith
*Assistant Examiner* — Ryan Schneer
(74) *Attorney, Agent, or Firm* — Bracewell LLP; Contance G. Rhebergen; Kevin R. Tamm

(57) ABSTRACT

A three step method of using a non-acidic stimulation fluid in high temperature sandstone formation is provided. The method consists of using a preflush brine, a non-acidic stimulation fluid, and an overflush brine.

15 Claims, No Drawings

METHOD OF USING A NON-ACIDIC STIMULATION FLUID IN HIGH TEMPERATURE SANDSTONE FORMATIONS

RELATED APPLICATION

This application claims priority to U.S. Provisional Patent Application No. 61/579,914 titled "Method of Using a Non-Acidic Stimulation Fluid in High Temperature Sandstone Formations," filed on Dec. 23, 2011, the disclosure of which is incorporated herein by reference in its entirety.

FIELD OF THE INVENTION

This invention relates to a method for using a non-acidic composition to stimulate an underground petroleum or hydrocarbon bearing formation. More specifically, the invention relates to a method of using a sodium hydroxide containing solution to stimulate a sandstone formation at high temperatures.

BACKGROUND OF THE INVENTION

During well operations, chemicals are often injected into the underlying formation in a process known as stimulation. Stimulation of the formation is one technique that can be used to increase the net permeability of a formation or reservoir. Some exemplary known stimulation techniques include: (1) injection of chemicals into the wellbore to react with and dissolve conditions limiting production (e.g., the presence of clays and drilling solids); (2) injection of chemicals through the wellbore and into the formation to react with and dissolve portions of the formation, or to create alternative flow paths for recoverable hydrocarbons (e.g. acid-fracturing or matrix-acidizing); and (3) injection of chemicals through the wellbore and into the formation at pressures sufficient to cause fractures in the formation, thereby creating a flow channels through which hydrocarbons can more readily move from the formation into the wellbore.

In particular, sandstone formations are particularly susceptible to formation damage from formation minerals such as clay and other siliceous deposits. Historically, acid, or acid-based fluids have been used in the treatment or stimulation due to their ability to dissolve both formation minerals and contaminants (e.g., drilling fluid coating the wellbore or that has penetrated into the formation) introduced into the wellbore/formation during drilling or remedial operations.

The removal of formation minerals and other deposits, such as clays or drilling solids, are key concerns in well completion operations. The known prior art techniques noted above typically involve highly concentrated acids, such as hydrofluoric acid (HF) and hydrochloric-hydrofluoric acid mixtures, which are both highly corrosive and can create dangerous operating conditions.

One difficulty encountered with traditional sandstone stimulation operations that employ HF is that HF can precipitate into the formation, causing formation damage and limiting matrix stimulation treatment efficiency. The damage caused by the fluoride precipitations are aggravated by higher temperatures. Another difficulty encountered with traditional HF sandstone stimulation is the acid reacts instantaneously with the formation, thereby limiting penetration of the acid into the formation. Therefore, it would be advantageous to use a stimulation fluid that does not form precipitants when it reacts with the sandstone formation at high temperatures and has a slower reaction rate.

SUMMARY

The current invention provides a method for using a non-acidic stimulation fluid in high temperature sandstone formations. The non-acidic stimulation fluid is provided as an alternative to traditional stimulation methods that typically involve hydrofluoric and/or hydrochloric acids. The non-acidic stimulation fluid has a slower reaction time with the sandstone formation, thereby allowing for deeper penetration into the formation. Additionally, the non-acidic stimulation fluid does not form precipitations after reaction with the sandstone formation that can damage the wellbore upon further stimulation techniques.

In one embodiment, a method for stimulating a hydrocarbon containing formation using a non-acidic stimulation fluid is provided. The method includes involves three steps. In a first step, a preflush brine is injected into the sandstone formation. In the second step, a non-acidic stimulation fluid is injected into the foundation. Finally, in the third step, an overflush brine is injected into the sandstone formation. In this embodiment, no other stimulation fluid is used. The method is operable to allow efficient and effective penetration of the non-acidic stimulation fluid into the sandstone formation.

In one embodiment, the preflush brine is chosen from a group of halide-containing brines. In certain embodiments, the preflush brine can be aqueous ammonium chloride. Preferred concentration of aqueous ammonium chloride is in a range of between about 5 and 10% by weight, more preferably in a range of 5-8% by weight. In other embodiments, the preflush brine can be potassium chloride. In a preferred embodiment, concentration of potassium chloride will be in a range of between about 3 and 8% by weight, more preferably 4-6% by weight. In one embodiment, the preflush brine is injected into the sandstone formation first.

In one embodiment, the non-acidic stimulation fluid is a sodium hydroxide solution. In certain embodiments, the concentration of the sodium hydroxide solution is in a range of between about 5 to 28% by weight. In one embodiment, the sodium hydroxide solution is injected into the sandstone formation after the preflush brined. In one embodiment, the non-acidic stimulation fluid is only sodium hydroxide solution. In this embodiment, no acid stimulation fluid is used. In another embodiments, the non-acidic stimulation fluid is a potassium hydroxide solution. In certain embodiments, the concentration of the potassium hydroxide solution is in a range of between about 5 to 28% by weight. In certain embodiments, the potassium hydroxide solution is injected into the sandstone formation after the preflush brine.

In one embodiment, the overflush brine is selected from a group of halide-containing brines. In certain embodiments, the brine can be aqueous ammonium chloride in a concentration range between about 5 to 10% by weight, alternatively between 5-7%, 7-9% or 9-10% by weight. In one embodiment, the overflush brine is injected into the sandstone formation third.

In certain embodiments, high temperatures are advantageous to increase the efficiency of the non-acidic stimulation fluid. In one embodiment, the non-acidic stimulation fluid is preheated in a range between about 20° C. to 70° C. before injection. In certain embodiments, the non-acidic stimulation fluid is allowed to react with the sandstone formation for between about 3 to 24 hours. In other embodiments, the temperature of the sandstone formation can be used to heat the non-acidic stimulation fluid after injection. In certain embodiments, the non-acidic stimulation fluid is allowed to react with the sandstone formation for between about 3 and 24 hours.

DETAILED DESCRIPTION OF THE INVENTION

Although the following detailed description contains many specific details for purposes of illustration, it is understood that one of ordinary skill in the art will appreciate that many examples, variations and alterations to the following details are all within the scope and spirit of the invention. Accordingly, the exemplary embodiments of the invention described herein are set forth without any loss of generality, and without imposing limitations, relating to the claimed invention.

The present invention addresses problems associated with prior art methods for the stimulation of sandstone formations at high temperatures and the highly corrosive acids typically employed, and provides a new non-acidic stimulation methods. The methods described herein generally include a three step process consisting of injecting a preflush brine, followed by injecting a non-acidic stimulation fluid, and finally injecting an overflush brine. Generally, the non-acidic stimulation fluid reacts with the sandstone formation slowly to enable deeper penetration into the sandstone formation. Additionally, the use of a non-acidic stimulation fluid does not result in the formation of precipitates during reaction.

As used herein, "sandstone" refers to any formation primarily composed of quartz sand and various forms of feldspar and clays. The grains of sandstone rock are traditionally sand-sized.

As used herein, "preflush" refers to a fluid pumped into the wellbore ahead of the main stimulation treatment fluids to displace potassium, sodium, and calcium ions in order to minimize the possibility adverse reactions with the treating fluids (e.g. clogging the pores of the foundation).

As used here, "overflush" refers to a fluid pumped into the wellbore after the stimulation treatment is complete. The overflush fluid helps to push the main treatment fluid deeper into the sandstone formation and away from the near-wellbore formation to prevent precipitation of reaction products as the treatment fluids are flowed back.

As used herein, "brine" refers to an aqueous solution containing dissolved inorganic salts that is solid-free.

In one aspect, a method for injecting a non-acidic stimulation fluid into a high temperature sandstone formation is provided. In one embodiment, the method consists of three steps—injection a preflush brine solution, followed by injecting a non-acidic stimulation fluid, and then injecting an overflush brine solution.

In one embodiment of this invention, the preflush brine solution can be selected from a group of halide-containing brines. In one embodiment, the preflush brine can be aqueous ammonium chloride in a concentration range of between about 5 to 10% by weight, alternatively between 5-8% by weight. In other embodiments, the preflush brine can be potassium chloride, in a preferred embodiment, concentration of potassium chloride will be in a range of between about 3 and 8% by weight, more preferably 4-6% by weight.

In one embodiment of this invention, the non-acidic stimulation fluid can be a sodium hydroxide solution. In certain embodiments, the concentration of the sodium hydroxide solution can be in a range of between about 5 to 28% by weight, preferably from 5-15% by weight, more preferably 5-8% by weight. The sodium hydroxide solution is generally injected into the high temperature sandstone formation directly after the injection of the preflush brine, and before the injection of the overflush brine. In certain embodiments, the sodium hydroxide solution is allowed to react with the sandstone formation for more than three hours. In another embodiment, the non-acidic stimulation fluid can be a potassium hydroxide solution. In certain embodiments, the concentration of the potassium hydroxide solution can be in a range of between about 5 to 28% by weight, preferably 5-15% by weight, more preferably 5-8% by weight. The potassium hydroxide solution is generally injected into the high temperature sandstone formation directly after the injection of the preflush brine, and before the injection of the overflush brine. In certain embodiments, the potassium hydroxide solution is allowed to react with the sandstone formation for more than three hours.

In one embodiment of this invention, the overflush brine solution can be selected from a group of halide-containing brines. In one embodiment, the overflush brine can be aqueous ammonium chloride in a concentration range of between about 5 to 10% by weight, alternatively between 5-7%, 7-9% or 9-10% by weight.

In certain embodiments of this invention, the non-acidic stimulation fluid is preheated to a temperature in a range of between about 20 to 70° C. before injection. In certain embodiments, the temperature range of the non-acidic stimulation fluid can be in a range between about 50 to 70° C., as the higher temperature enhances the stimulation efficiency of the sodium hydroxide solution by enabling a slower reaction time with and deeper penetration into the formation rock.

EXAMPLES

The examples below are provided to show a certain exemplary non-acidic sandstone stimulation fluid, as described herein, and its solubility in sandstone formation at differing concentrations and temperatures. A sodium hydroxide solution was allowed to react with sandstone formation at varying temperatures and concentrations for three hours. As shown in Table 1, a 5% by weight sodium hydroxide solution, was preheated to temperatures of 23° C. and 49° C., and allowed to react with the sandstone formation for 3 hours. The solubility of the sodium hydroxide solution in the formation rock at these temperatures was 24% by weight and 3.2% by weight, respectively. In another test, a 15% by weight sodium hydroxide solution, preheated to 70° C., was allowed to react with the sandstone formation and its solubility in the sandstone formation was 4.55% by weight. The examples show a clear correlation that increasing the temperature and concentration of the sodium hydroxide solution increases the sodium hydroxide solutions' permeability in the sandstone formation.

TABLE 1

| % wt concentration of NaOH | Reaction Temperature, ° C. | Sandstone solubility, % wt |
|---|---|---|
| 5% wt | 23° C. | 2.4% wt |
| 5% wt | 49° C. | 3.2% wt |
| 15% wt | 70° C. | 4.55% wt |

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

That which is claimed is:

1. A non-acidic method for the stimulation of a sandstone formation, the method comprising the steps of:
    injecting a preflush brine solution into the wellbore such that the brine solution displaces potassium, sodium and calcium ions in the sandstone formation, wherein the preflush brine solution comprises aqueous solution selected from the group consisting of: aqueous ammonium chloride brine between about 5% and about 10% by weight and aqueous potassium chloride brine between about 3% and about 8% by weight;
    after injecting the preflush brine solution, then injecting a basic stimulation fluid into the wellbore, without the use of an acidic stimulation fluid, such that the basic stimulation fluid solubilizes at least a portion of the sandstone formation, wherein the basic stimulation fluid comprises aqueous sodium hydroxide solution between about 5% and about 28% by weight; and
    injecting an overflush brine solution into the wellbore, wherein the non-acidic method for the stimulation of the sandstone formation produces substantially no precipitates in the sandstone formation.

2. The method of claim 1, wherein the aqueous ammonium chloride brine is in a concentration range between about 5-8% by weight.

3. The method of claim 1, wherein the aqueous ammonium chloride brine is in a concentration range between about 8-9% by weight.

4. The method of claim 1, wherein the aqueous ammonium chloride brine is in a concentration range between about 9-10% by weight.

5. The method of claim 1 wherein the concentration range of the aqueous sodium hydroxide solution is between about 5-8% by weight.

6. The method of claim 1 wherein the concentration range of the aqueous sodium hydroxide solution is between about 5-15% by weight.

7. The method of claim 1 wherein the temperature of the aqueous sodium hydroxide solution is between about 20 to 70° C., prior to injection.

8. The method of claim 1 wherein the overflush brine is selected from a group of halide-containing brines.

9. The method of claim 1 wherein the overflush brine is aqueous ammonium chloride in a concentration range of between about 5 to 10% by weight.

10. The method of claim 9 wherein the concentration range of the ammonium chloride brine is between about 5-7% by weight.

11. The method of claim 9 wherein the concentration range of the ammonium chloride brine is between about 7-9% by weight.

12. The method of claim 9 wherein the concentration range of the ammonium chloride brine is between about 9-10% by weight.

13. The method of claim 1, wherein the aqueous potassium chloride brine is in a concentration range between about 4-6% by weight.

14. The method of claim 1, wherein the overflush brine is aqueous potassium chloride in a concentration range of between about 3% to about 8% by weight.

15. The method of claim 14, wherein the aqueous potassium chloride brine is in a concentration range between about 4% to about 6% by weight.

* * * * *